United States Patent [19]

Boutrais et al.

[11] Patent Number: 4,779,363

[45] Date of Patent: Oct. 25, 1988

[54] APPARATUS ADAPTABLE ON A PUSHER VEHICLE, FOR THE REMOVAL AND LOADING OF OBJECTS SUCH AS REFUSE LYING ON THE GROUND

[76] Inventors: Jacques Boutrais, 23, Passage Dubail, 75010 Paris, France; Bernard Charraire, 31 Allée du Muguet, 77490 Chelles Les Coudreaux, France

[21] Appl. No.: 832,699

[22] Filed: Feb. 25, 1986

[30] Foreign Application Priority Data

Feb. 27, 1985 [FR] France .................. 85 02868

[51] Int. Cl.⁴ .............................................. E02F 3/76
[52] U.S. Cl. .................................. 37/117.5; 37/118 R; 172/815; 414/469; 414/480
[58] Field of Search .............. 37/118 R, 118 A, 117.5, 37/103, 264, 120, 122, 124, DIG. 13, 280, 281, 232, 233, 284, 130, 133; 172/815; 414/469, 477, 480, 779, 24.5, 912, 919, 347, 364

[56] References Cited

U.S. PATENT DOCUMENTS

| | | | |
|---|---|---|---|
| 3,166,339 | 1/1965 | Earley | 37/130 X |
| 4,089,431 | 5/1978 | Stedman | 37/118 R |
| 4,372,617 | 2/1983 | Zamboni | 172/815 |
| 4,619,570 | 10/1986 | Siebenga | 414/469 |

FOREIGN PATENT DOCUMENTS

| | | | |
|---|---|---|---|
| 303384 | 9/1919 | Fed. Rep. of Germany | 37/118 R |
| 819271 | 4/1981 | U.S.S.R. | 37/118 R |

Primary Examiner—E. H. Eickholt
Attorney, Agent, or Firm—Sandler & Greenblum

[57] ABSTRACT

Apparatus adaptable on a pusher vehicle for clearing and collecting objects such as refuse lying on the ground for their removal and possibly their loading, characterized in that it includes a fixed rear wall, substantially vertical, on which are articulated side walls, said rear wall being provided at its lower portion with retractable means forming a liftable bottom member for the collection of objects, their transportation and possibly their lifting up.

7 Claims, 5 Drawing Sheets

APPARATUS ADAPTABLE ON A PUSHER VEHICLE, FOR THE REMOVAL AND LOADING OF OBJECTS SUCH AS REFUSE LYING ON THE GROUND

BACKGROUND OF THE INVENTION

The present invention relates to an apparatus adapted for attachment to a pusher vehicle for use in clearing, collecting, and transporting objects lying on the ground. The apparatus is more particularly, but not exclusively, intended for use in cleaning streets, market places, dumping grounds, and similar areas.

DISCLOSURE OF THE INVENTION

Presently, the collecting work to which the instant invention relates is carried out manually, using rudimentary tools and at the price of lengthy, tiresome, and costly work.

The apparatus of the instant invention makes it possible to carry out this work with optimum rapidity, facility, and efficiency.

This apparatus, adapted for attachment to a pusher vehicle, includes a substantially vertical, fixed rear wall, onto which side walls are pivotably jointed. At the lower portion of the rear wall, retractable means are located which form a liftable bottom member onto which objects lying on the ground may be loaded for clearing, collection, and transportation.

The rear wall of the apparatus is adapted for attachment to the pusher vehicle by an assembly which includes a damping system, providing suspension of the apparatus in a raised position, and a constant application of the base of the rear wall to the ground in a lowered position whatever the unevenness of the ground.

The damping system includes a support frame adapted to be attached to the pusher vehicle and mounted so as to be slidable against damping means, such as springs, on rods or bars rigidly connected to the rear wall. The support frame moves between an upper abutment and a lower abutment formed on the rods or bars; these abutments limit the movement of the support frame and of the damping means, which are compressed between the upper abutment of the rods or bars and the corresponding high portion of the support frame.

Retractable means, including a liftable bottom member, are mounted on the rear wall. These means may be retracted during the pushing of objects, and may be extended when the objects are confined between the rear wall and the side walls of the apparatus, thereby loading the objects onto the apparatus for clearing, collection, and transportation.

The retractable bottom member provides, as one of its parts, a surface onto which objects may be loaded. This surface need not be continuous and may be in the form of a blade chassis, which is subject to the action of means such as jacks and which may be moved between two positions: a first position close to the vertical, which is generally used while the objects are being pushed; and a second position close to the horizontal, which is generally used to support the objects for clearing, collection, or transportation.

The chassis blades are mounted on parallel rods or bars, which are subjected to the action of means such as jacks, said rods or bars being in turn mounted on parts provided with means to permit passage of the chassis from a substantially vertical, retracted position to a substantially horizontal, extended position.

The various features and advantages of the invention will become more apparent from the following description of two possible embodiments. Obviously, these are only non-limiting examples which in no way define the scope of the invention, which extends to any and all means and materials suitable for practicing the invention.

BRIEF DESCRIPTION OF DRAWINGS

For this description, reference is made to the accompanying drawings wherein.

DETAILED DESCRIPTION OF INVENTION

In a first embodiment, the apparatus includes a substantially vertical rear wall 1, adapted for attachment to a pusher vehicle, and onto which side walls 3 are pivotably jointed via hinges 2. Underneath side walls 3 and rear wall 1, flaps 4 are provided for scraping the ground when the apparatus is being pushed. Advantageously, these flaps are mounted on the walls so as to move in a vertical plane in order to adapt to ground unevenness. This mounting can be provided, for example, using a rod, rigidly connected to the flap and to the corresponding wall and surrounded by a spring which is compressed between an abutment on the rod or wall and the flap so as to press the flap towards the ground.

Figure 2:
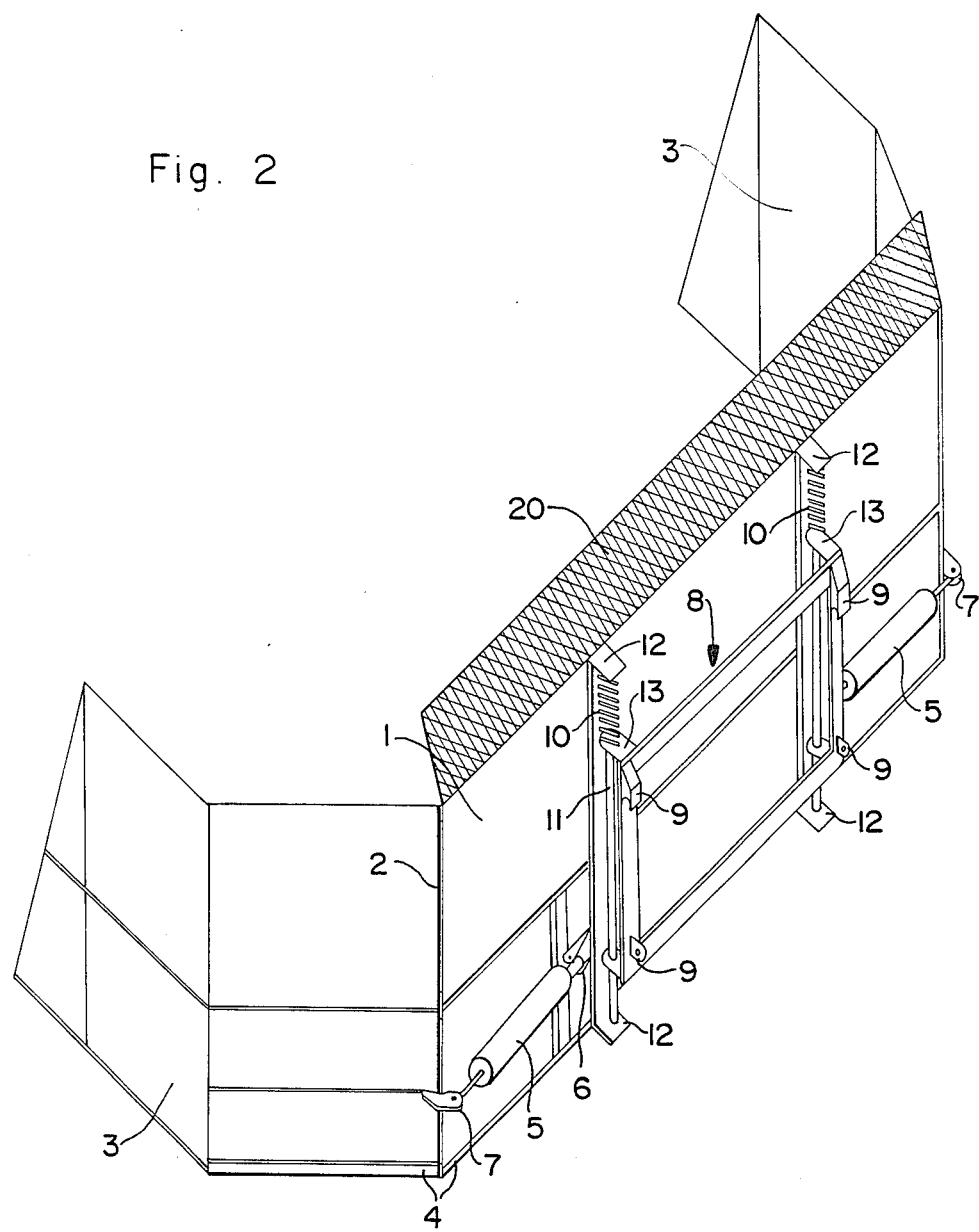
FIG. 2 is a view similar to FIG. 1 but is a ¾ rear perspective view of the apparatus.

With reference to FIG. 2, jacks 5 act on side walls 3 to permit pivoting of the side walls with respect to rear wall 1. These jacks are attached at one end to a clevis 6 rigidly connected to rear wall 1, and at the other end to a clevis 7 rigidly connected to the corresponding side wall 3. Clevis 7 acts as an abutment for the side walls in their opened position.

The apparatus is attached to the pusher vehicle by a system which can be seen more particularly in FIG. 2. This system includes a frame 8, with top and bottom attachment points 9, adapted to be compatible with the pusher vehicle tool-carriers and mounted so as to be slidable against springs 10 on rods 11. Rods 11 are rigidly connected to rear wall 1 and include, at each of their ends, an abutment 12 which defines the stroke of frame 8. Springs 10 are confined between the upper abutments of the rods and supports 13 provided on frame 8.

As can be seen from the foregoing description, the means for attaching the apparatus of the invention to the pusher vehicle provide on the one hand the resilient suspension of the apparatus when the apparatus is in a raised position, while on the other hand the rear wall base is kept in constant contact with the ground, whatever its unevenness, when the apparatus is in a lowered position.

The apparatus according to the invention includes a bottom member providing a surface, which need not be continuous, onto which objects may be loaded. In the embodiment shown in FIGS. 3 to 6, the bottom member is formed of blades 14 mounted on rods, bars, or their equivalent 15.

Figure 1:
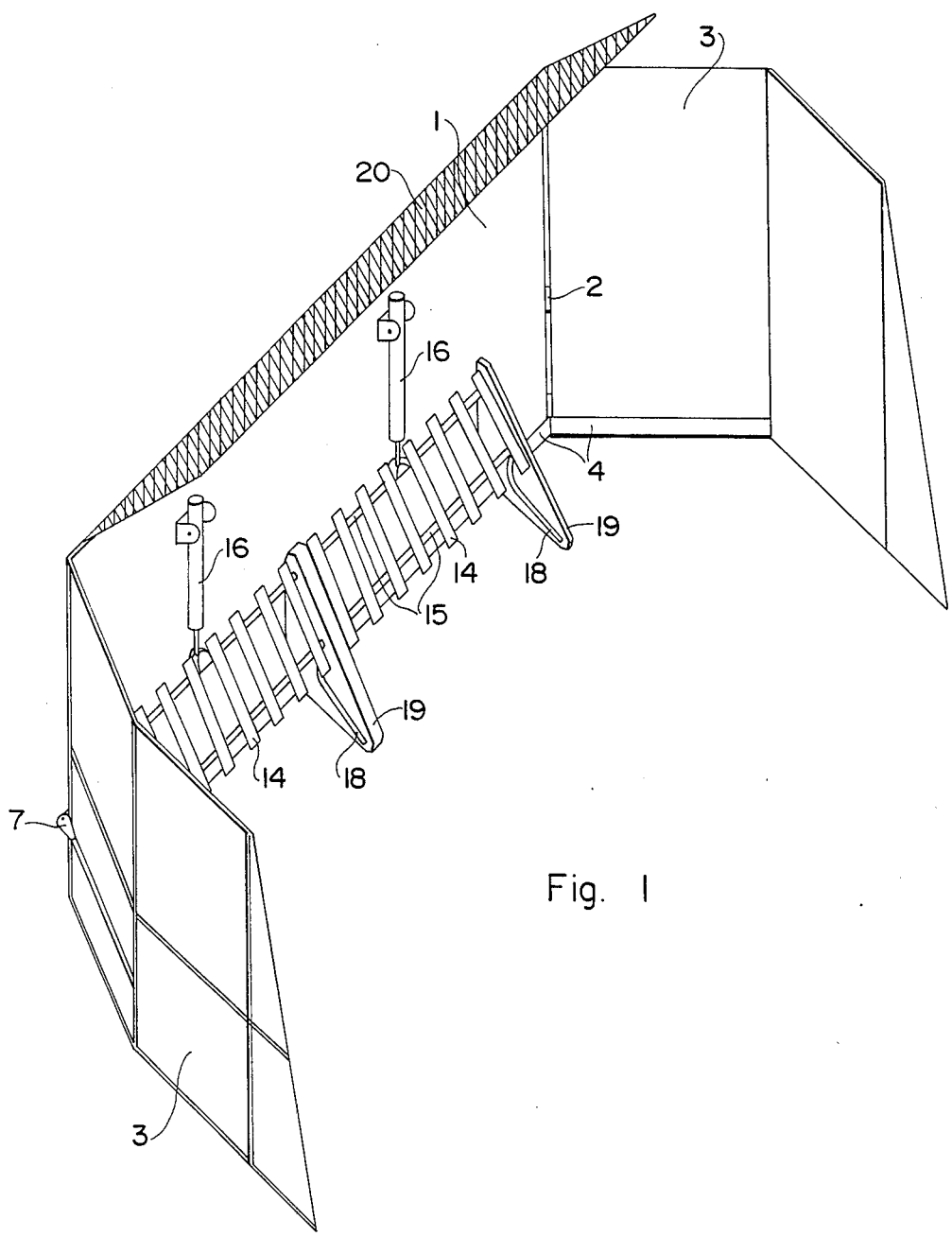
FIG. 1 is a ¾ frontal perspective view of the apparatus according to the invention.
Figure 3:
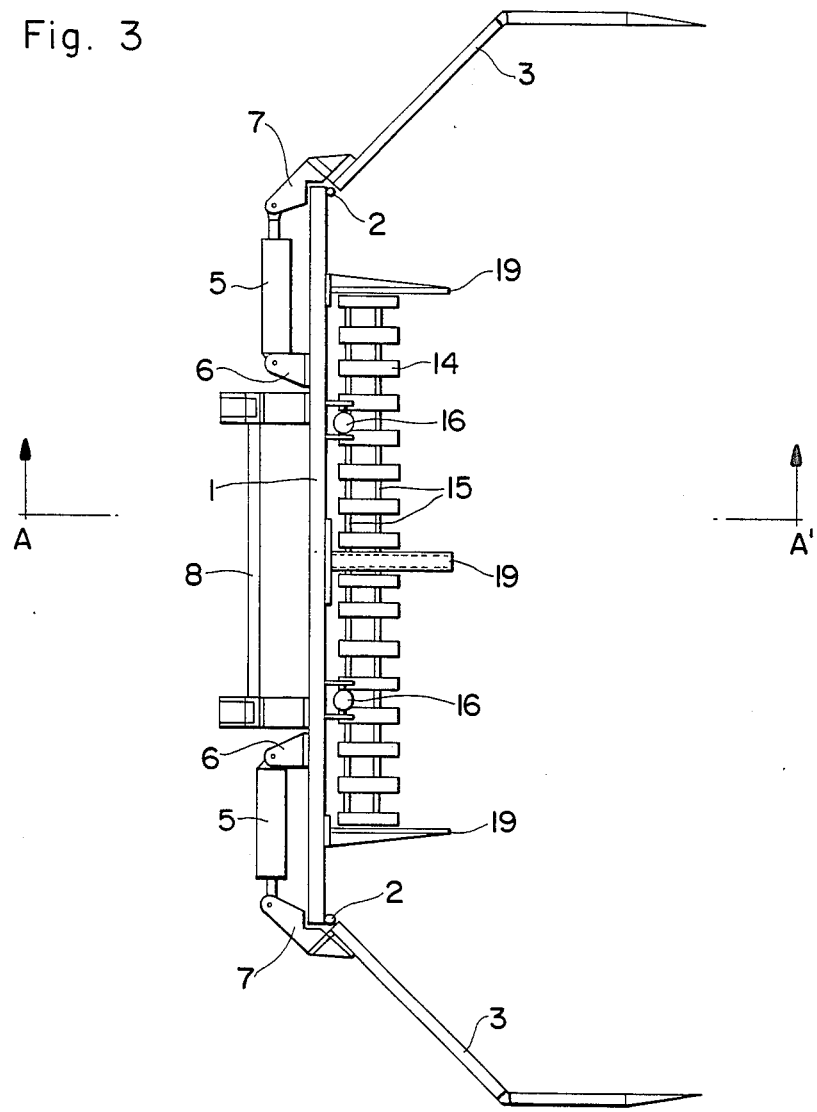
FIG. 3 is a top view of the apparatus, in the opened position of the side walls, the bottom member being retracted.
Figure 4:
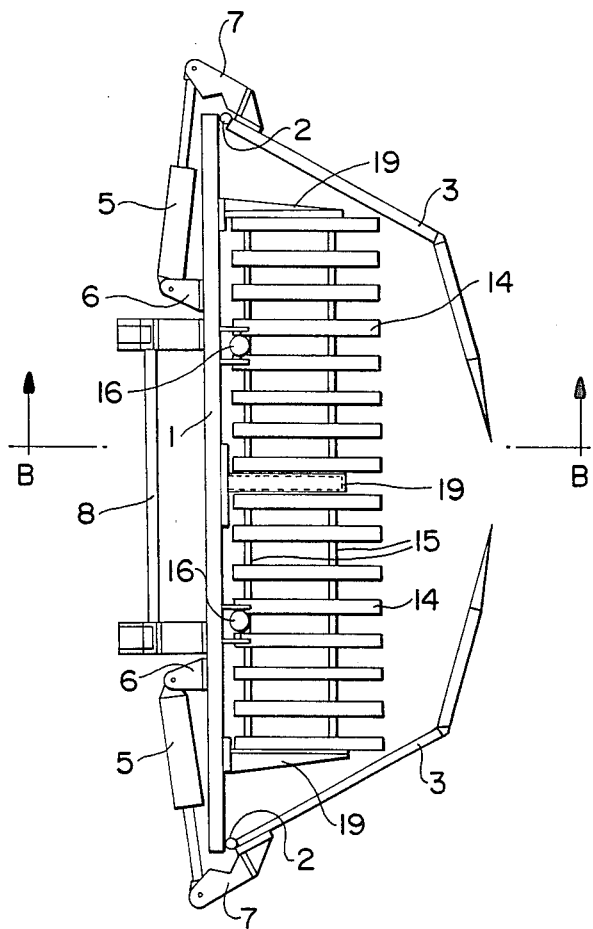
FIG. 4 is a bottom view of the apparatus, in a closed position of the side walls, the bottom member being extended.
Figure 5:
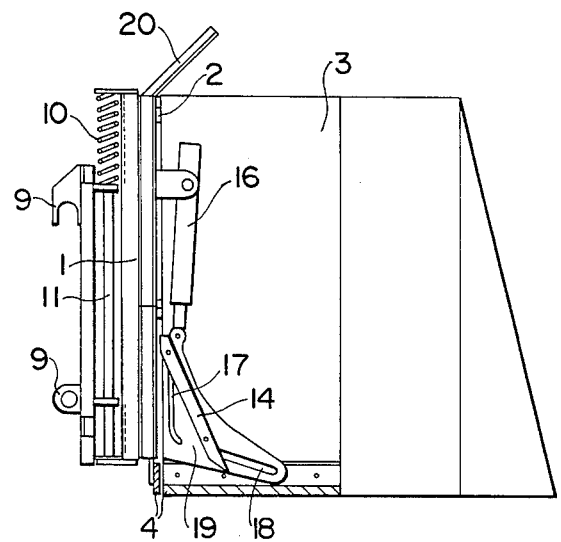
FIG. 5 is a sectional view along line A—A' of FIG. 3.
Figure 6:
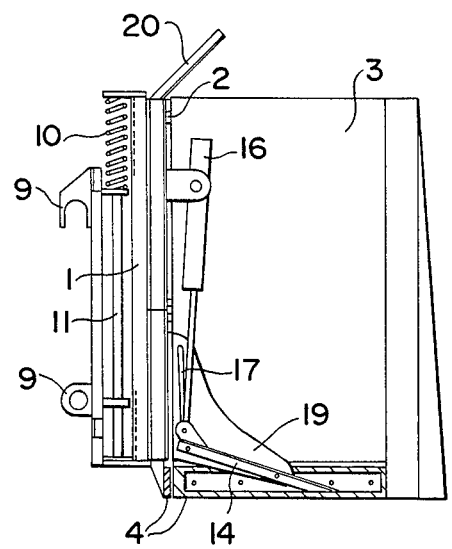
FIG. 6 is a sectional view along line B—B' of FIG. 4.

With reference to FIGS. 1, 5, and 6, rods 15 are subject to the action of jacks 16 attached to the anterior face of rear wall 1. The ends of rods 15 extend through cam slots 17 and 18 formed in parts 19 rigidly connected to rear wall 1. This permits the bottom member to occupy two positions: a retracted position close to the vertical as shown in FIGS. 1 and 3, most useful while the apparatus is moving or being used to collect objects, because this will avoid pushing the objects outside the reach of the apparatus; and an extended position close to the horizontal as shown in FIG. 4, most useful when collection of objects has been completed.

With reference to FIGS. 5 and 6, upper cam slot 17 extends in a substantially vertical direction, and lower cam slot 18 is slightly inclined in a substantially horizontal direction.

In this manner the invention provides for the two required positions of the bottom member. In order to avoid inadvertently pushing objects outside the reach of the apparatus, passage of the bottom member from the vertical, retracted position to the extended, horizontal position is effected when collection of objects is completed.

As may be seen in FIGS. 1 and 2, a protective grid 20 slanting frontwardly from the apparatus is mounted over the whole length of the wall. The grid operates as an anti-spilling device when objects are captured between the side walls in their closed position.

The side walls can assume various shapes. As in the example under discussion, they can be folded in their middle portion so as to include an angle of about 135°, with their ends substantially perpendicular to rear wall 1 in their opened position and substantially parallel to rear wall 1 in their closed position so as to entrap and precompress the collected objects.

However, the walls can also be of a general curved shape, following any required curvature.

Rear wall 1 may also be of a curved shape, so as to present in its lower portion an efficient angle of attack. The side wall hinges may be mounted on the rear wall, which may further have flanges connected to its front face at right angles. The flanges may be formed, in their lower portion, with the cam slots 17 and 18, and may have jacks 16 attached to their upper portion.

As regards the use of jacks in the invention, a double action hydraulic system may be used, but pressure limiters can be used for the return strokes of the jacks acting on the side walls and for the outward strokes of the jacks acting on the retractable bottom member. This system may provide for a cooperative succession of movements of the side walls and the bottom member, whereby closing the side walls may be followed by extending the bottom member, or retracting the bottom member may be followed by opening the side walls.

Generally, the invention is adaptable to many variants without departing from its scope.

For example, the jacks acting on the retractable bottom member can be attached to the posterior face of the rear wall, which would further involve a modification of the means for attaching the apparatus to the pusher vehicle or a modification of the rear wall design.

As regards the pressure limiters to which reference has been made hereinabove, they are not useful if the motions of the bottom member and of the side walls are controlled independently by a hydraulic control, by using a double action function applied to each of the bottom member and side walls.

Throughout this specification, reference has been made to particular means, materials, and conditions for practicing the instant invention. It is to be understood that these means, materials, and conditions in no way limit or define the scope of the invention, which extends to any and all means, materials, and conditions suitable for the practice of the invention.

We claim:

1. An apparatus for use in clearing, collecting, and transporting objects, comprising a rear wall; retractable means, located at the lower portion of said rear wall, forming a liftable bottom member for loading objects onto the apparatus; and side walls pivotably attached to said rear wall, wherein said liftable bottom member comprises a surface for loading the objects being cleared, collected, or transported onto the apparatus; wherein said liftable bottom member is subject to the action of means for moving said liftable bottom member between a first, substantially vertical position and a second, substantially horizontal position; wherein said liftable bottom member further comprises a blade chassis mounted on rods, said rods being subject to the action of means, attached to the anterior face of said rear wall, for moving said rods; wherein said rods extend through cam slots formed in support parts rigidly connected to said rear wall; and further wherein at least one cam slot in each support part extends in a substantially vertical direction and at least one other cam slot in each support part extends in a substantially horizontal direction.

2. An apparatus as defined in claim 1, wherein said means for moving said rods comprise jacks.

3. An apparatus for use in clearing, collecting, and transporting objects, comprising a rear wall; retractable means, located at the lower portion of said rear wall, forming a liftable bottom member for loading objects onto the apparatus; and side walls pivotably attached to said rear wall, wherein said rear wall has a curved shape and is provided with flanges connected to said rear wall at right angles thereto, said flanges comprising cam slots in their lower portion, attachment points for means for moving said liftable bottom member in their uppper portion, and attachment points for hinges for said side walls.

4. An apparatus for use in clearing, collecting, and transporting objects, comprising a rear wall; retractable means, located at the lower portion of said rear wall, for loading the objects onto the apparatus; and side walls pivotably attached to said rear wall, wherein flaps are provided underneath said side walls as well as underneath said rear wall, said flaps being mounted on the walls which they equip so as to permit movement of said flaps in a vertical plane, whereby the position of said flaps adapts to ground unevenness.

5. An apparatus as defined by claim 4, further comprising means for connecting said rear wall to a pusher vehicle, said connecting means including damping means, and said connecting means being capable of assuming a first position whereby the apparatus is maintained in a raised position relative to the ground surface, and a second position whereby the apparatus is maintained in a lowered position relative to the ground surface and the lower portion of said rear wall is held in contact with the ground surface.

6. An apparatus as defined by claim 5, wherein said connecting means comprise a support frame adapted to be attached to the pusher vehicle and mounted so as to slide against said damping means on means, such as rods, rigidly connected to said rear wall between an upper and a lower abutment on said rigidly connected means.

7. An apparatus for use in clearing, collecting, and transporting objects, comprising a rear wall; retractable means, located at the lower portion of said rear wall, for loading the objects onto the apparatus; and at least one side wall pivotably attached to said rear wall, wherein flaps are provided underneath said at least one side wall as well as underneath said rear wall, said flaps being mounted on the walls which they equip so as to permit movement of said flaps in a vertical plane, whereby the position of said flaps adapts to ground unevenness.

* * * * *